United States Patent
Army, Jr. et al.

[11] Patent Number: 5,133,194
[45] Date of Patent: Jul. 28, 1992

[54] AIR CYCLE MACHINE AND FAN INLET/DIFFUSER THEREFOR

[75] Inventors: Donald E. Army, Jr., Springfield, Mass.; Christopher McAuliffe, Windsor; William C. Crabtree, Tariffville, both of Conn.

[73] Assignee: United Technologies Corporation, Hartford, Conn.

[21] Appl. No.: 650,343

[22] Filed: Feb. 4, 1991

[51] Int. Cl.[5] ............................ F25D 9/00; F25B 9/00
[52] U.S. Cl. ........................................ 62/401; 62/402; 62/87; 415/117; 417/407
[58] Field of Search .................. 62/401, 402; 417/407; 415/182.1, 117

[56] References Cited

U.S. PATENT DOCUMENTS

| | | | |
|---|---|---|---|
| 3,080,728 | 3/1963 | Groves et al. | 62/401 X |
| 3,425,238 | 2/1969 | Sylvan | 62/401 X |
| 3,878,692 | 4/1975 | Steves | 62/87 |
| 4,021,215 | 5/1977 | Rosenbush et al. | 62/402 |
| 4,334,411 | 6/1982 | Payne | 62/402 X |
| 4,352,273 | 10/1982 | Kinsell et al. | 62/87 |
| 4,374,469 | 2/1983 | Rannenberg | 62/402 |
| 4,430,867 | 2/1984 | Warner | 62/402 |
| 4,553,407 | 11/1985 | Rannenberg | 62/402 |
| 4,580,406 | 4/1986 | Nims | 62/402 X |
| 4,829,775 | 5/1989 | Defrancesco | 62/402 X |
| 4,963,174 | 10/1990 | Payne | 62/87 |
| 5,014,518 | 5/1991 | Thomson et al. | 62/402 X |

FOREIGN PATENT DOCUMENTS

| | | | |
|---|---|---|---|
| 426111 | 10/1974 | U.S.S.R. | 62/401 |
| 486193 | 1/1976 | U.S.S.R. | 62/401 |
| 1103056 | 7/1984 | U.S.S.R. | 62/401 |
| 428058 | 4/1935 | United Kingdom | 62/401 |
| 979936 | 1/1965 | United Kingdom | 62/401 |

Primary Examiner—Henry A. Bennet
Assistant Examiner—Christopher B. Kilner
Attorney, Agent, or Firm—William W. Habelt

[57] ABSTRACT

A fan inlet and diffuser apparatus (30) is provided with a lobed mixer (60) for intermixing fan bypass air (25) with a flow of fan discharge air (27). The fan inlet and diffuser apparatus (30) is particularly adapted for use in a inducing a flow of cooling air (21) through an upstream heat exchanger (20) and thence directing a portion (23) of the cooling air passing from the heat exchanger to the inlet side of the fan (14) of an air cycle machine (10), while directing the remaining portion (25) to bypass the fan (14) and pass into the central outlet flow passage (52) flowing over the mixing ejector (60) which imparts a directional swirl to the bypass flow (25) and a counter swirl to the fan discharge flow (27) passing from the fan outlet through the interior of the mixer (60), thereby enhancing the mixing of these two flows within the passage (52).

5 Claims, 3 Drawing Sheets

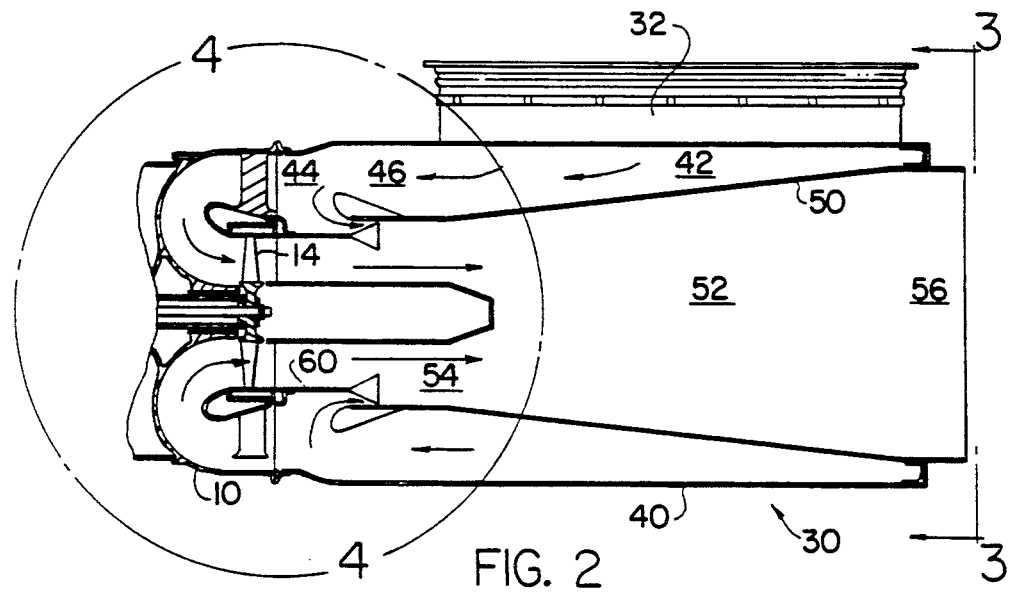
FIG. 2
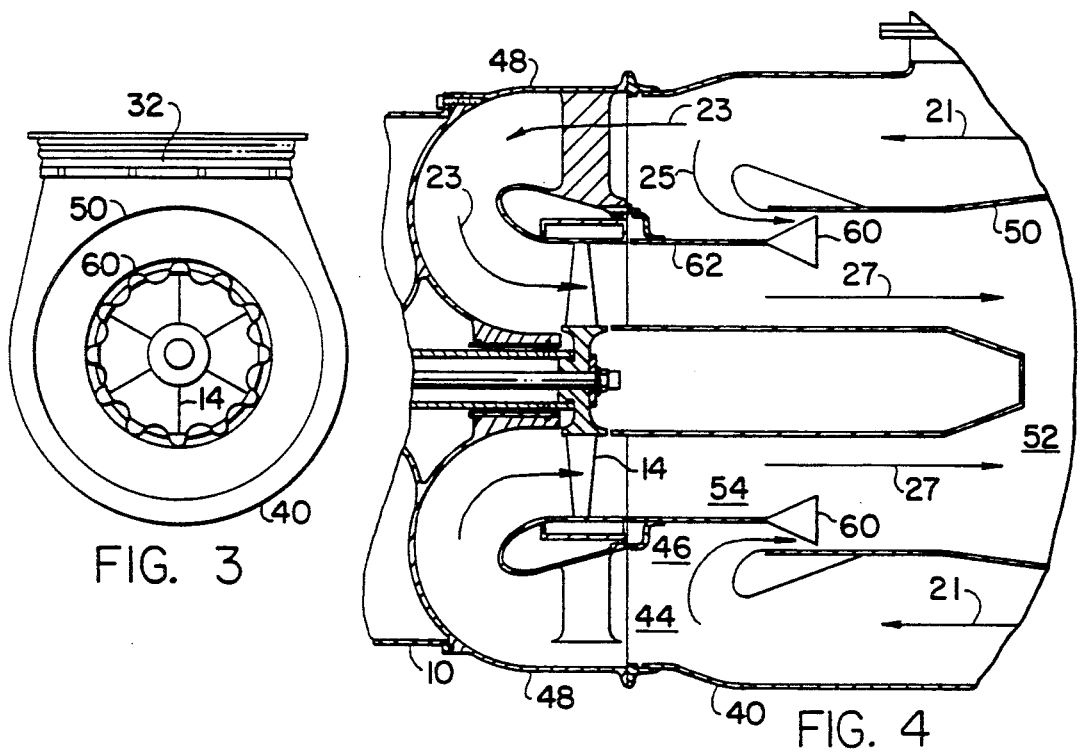
FIG. 3
FIG. 4

AIR CYCLE MACHINE AND FAN INLET/DIFFUSER THEREFOR

TECHNICAL FIELD

This invention relates broadly to an axial flow fan for inducing the flow of a gaseous fluid through an upstream device, such as a heat exchanger, and in particular to a fan inlet and diffuser apparatus for an air cycle machine of the type used in air conditioning systems on aircraft.

BACKGROUND ART

In modern commercial aircraft, an air cycle environmental control system is provided to suitably condition air to be supplied to the cabin or cockpit or other locations for occupant comfort. Typically, such air cycle systems condition a flow of pressurized air, for example bleed air from the aircraft engine, by not only regulating the pressure of the air to a desired level for cabin pressurization, but also by cooling and dehumidifying the air. Such systems are disclosed, for example, in commonly assigned U.S. Pat. Nos. 4,209,993 and 4,374,469, both of Rannenberg, and U.S. Pat. No. 4,430,867 of Warner.

As disclosed in these patents, the flow of compressed air to be conditioned is passed through the compressor section of an air cycle machine, thence further cooled to cause condensation of moisture in the air, thereby dehumidifying the air, prior to being expanded through the turbine section of the air cycle machine to a desired pressure level for delivery to its point of use, e.g. the aircraft passenger or pilot cabin. Typically, the air discharged from the turbine section of the air cycle machine is reheated prior to its delivery to its point of use by passing the turbine exhaust air in indirect heat exchange relationship with the compressed air being directed to the turbine thereby further cooling the compressed air and heating the turbine exhaust air.

In the air cycle machine, the turbine and the compressor thereof are mounted to a common shaft which is driven by the expansion of the compressed air through the turbine. Generally, an axial flow fan is also mounted to this common drive shaft at one end thereof and is therefore, like the compressor, driven by the turbine. This fan is typically utilized to draw a flow of cooling air through an upstream heat exchanger wherein the compressed air being conditioned is cooled by passing in indirect heat exchange relationship with the cooling air. Most commonly, the cooling air, typically ram air, enters the heat exchanger from outside the aircraft, passes through the heat exchanger and enters a fan inlet and diffuser housing which provides both an inlet flow passage for directing the cooling air through the fan and a diverging outlet flow passageway through which the exhaust air discharging from the fan is vented overboard.

The maximum load on such air cycle systems is experienced when the aircraft is on the ground on a hot day. Under such conditions, the fan operates under its highest load to draw a maximum flow of ambient air through the heat exchanger as cooling air and to vent the air back overboard. However, when in flight at normal cruise altitudes, the ambient air is much cooler, cabin cooling requirements are substantially reduced, and the ram pressure provides a substantial portion of the energy necessary to drive the ambient cooling air through the heat exchanger. Thus, the air cycle machine fan need only operate at a low power level to induce adequate cooling air flow through the heat exchanger. At altitudes between ground level and cruise, the fan will operate at intermediate load ratings selected to induce adequate cooling air flow through the heat exchanger so as to conserve power consumption which in turn results in lower fuel expenditure.

In order to provide for varying amounts of flow through the fan over the operating load range, it is desirable, and customary, in such prior art air cycle cooling systems to provide a fan bypass duct which directs a portion of the cooling air having passed through the heat exchanger around the fan rather the passing all of the cooling air flow through the fan. In order to control the amount of flow passing through the bypass, which varies from little or no bypass flow at ground to a substantial percentage of the total cooling air flow at cruise altitude, a bypass check valve must be provided in operative association with the bypass duct. Of course, the need for a fan bypass duct with a bypass check valve adds to the complexity of the air cycle cooling system as well as increasing its size and weight, all undesirable complications in aircraft applications where simplicity, low volume and low weight are desired.

DISCLOSURE OF INVENTION

It is an object of the present invention to provide a compact fan inlet and diffuser apparatus for use in ducting a first portion of a fluid stream to pass through a fan and a second portion of the fluid stream to bypass the fan, while ducting the recombined streams away from the fan discharge in an efficient manner.

It is also an object of the present invention to provide a compact fan inlet and diffuser apparatus for use in combination with an axial flow fan as a flow inducing apparatus wherein a mixing apparatus is incorporated within the fan inlet and diffuser apparatus having enhanced fluid dynamic pumping characteristics thereby reducing fan power expenditure.

It is a further object of the present invention to provide a low noise fan inlet and diffuser apparatus.

It is a still further object of the present invention to provide a compact fan inlet and diffuser apparatus for use in combination with an axial flow fan as a flow inducing apparatus for inducing a first portion of a fluid stream to pass through a fan and a second portion of the fluid stream to bypass the fan in such a manner as to eliminate the need for a separate bypass duct and bypass check valve.

The fan inlet and diffuser apparatus of the present invention is adapted for mounting to an axial flow fan, and particularly the fan of an air cycle machine of the type having a fan mounted to an end portion of an axially extending drive shaft driven by a turbine means mounted thereto, for the purpose of inducing a flow of fluid through an upstream device, e.g. for inducing the flow of cooling air through a heat exchanger in a conventional aircraft air conditioning system. The fan inlet and diffuser apparatus comprises: an axially extending outer housing having a proximate end adapted for mounting about the discharge side of the fan and an axially spaced distal end, an axially extending inner housing disposed coaxially within this outer housing and having a distal end connected to the distal end of the outer housing and a proximate end spaced inwardly from the proximate end of the outer housing thereby defining an outlet flow passageway for receiving fluid flow discharging from the fan interiorly of the inner housing and an inlet flow passageway thereabout between the inner housing and the outer housing, and mixing means operatively associated therewith. The outer housing has a first outlet at the proximate end thereof for directing a first portion of the fluid flow passing therethrough to the inlet side of the fan and a second outlet at the proximate end thereof for directing a second portion of the fluid flow passing therethrough directly into the outlet flow passageway disposed interiorly of the inner housing to be recombined therein with the flow discharging from the fan. The inner housing has a central inlet at the proximate end thereof for receiving fluid flow discharging from the fan and a central outlet at the distal end thereof discharging the recombined flow therefrom. The mixing means is operatively disposed relative to the second outlet of the inlet flow passageway and the discharge side of the fan for imparting swirl, most advantageously counter swirl, to the first portion of the fluid flow discharging from the fan and the second portion of the fluid flow bypassing the fan whereby the first and second portions are intermixed in the outlet flow passageway disposed interiorly of the inner housing. Advantageously, the mixing means comprises a lobed mixing ejector.

BRIEF DESCRIPTION OF DRAWING

These and other objects, features and advantages of the present invention will become more apparent in light of the detailed description of a best mode embodiment thereof, as illustrated in the accompanying drawing, wherein:

FIG. 2 is an enlarged sectional side elevation view of the fan inlet and diffuser apparatus of the present invention;

FIG. 3 is an end view taken along line 3—3 of FIG. 2;

FIG. 4 is an enlarged sectional side elevational view of the region encircled by line 4—4 of FIG. 2.

BEST MODE FOR CARRYING OUT THE INVENTION

The fan inlet and diffuser apparatus of the present invention is particularly suitable for use in combination with an air cycle machine and will be described herein in use in a conventional aircraft air conditioning system wherein the fan inlet and diffuser apparatus of the present invention is coupled to the fan end of an air cycle machine for inducing a flow of ram cooling air through an upstream heat exchanger to assist in cooling the compressed air being conditioned for use in the passenger or pilot cabins of the aircraft. It is to be understood, however, that the fan inlet and diffuser housing of the present invention may be utilized in any other applications without departing from the spirit and scope of the present invention.

Figure 1:
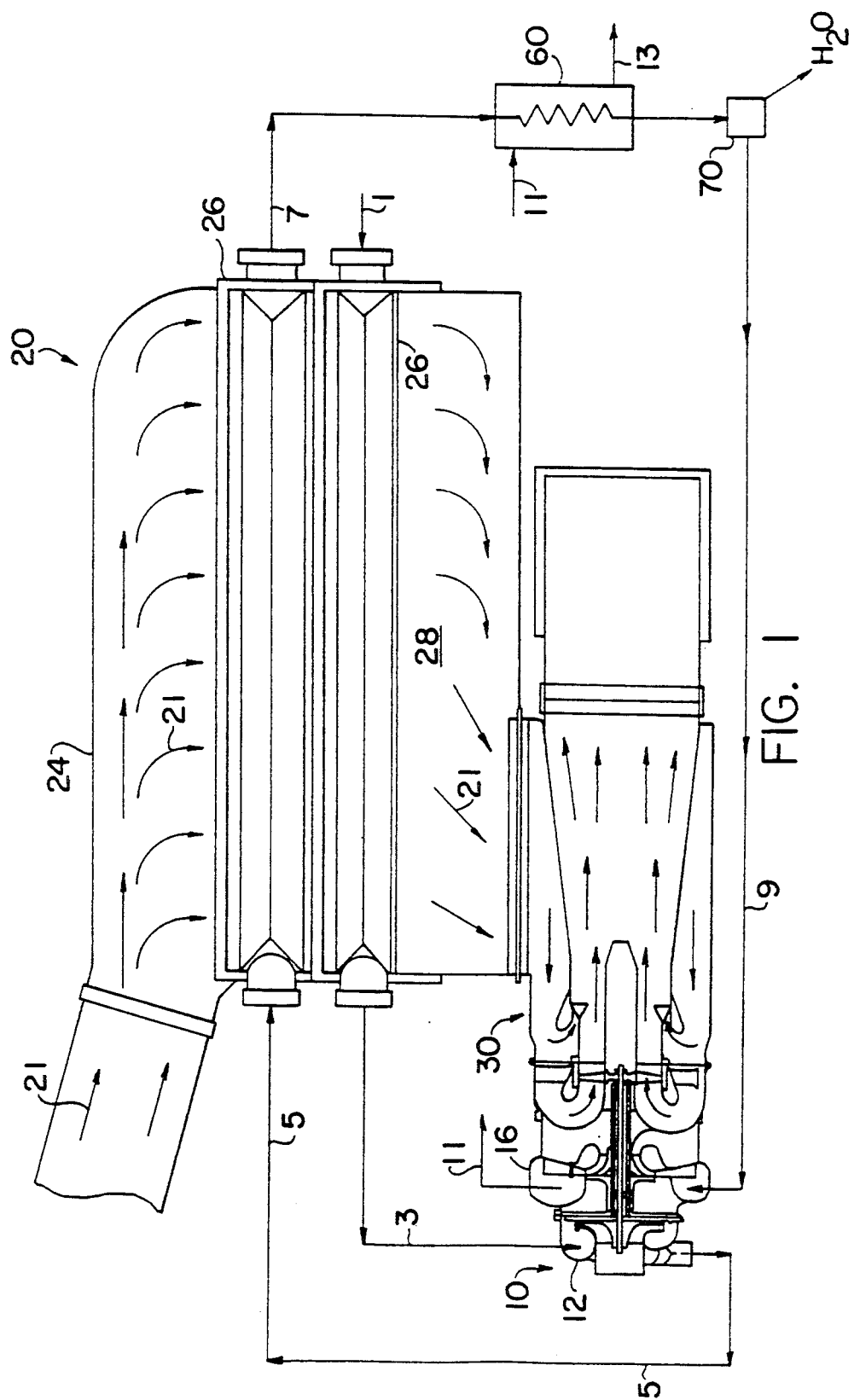
FIG. 1 is a side elevational view, partly in section, of an air cycle machine equipped with a fan inlet and diffuser apparatus in accord with the present invention and utilized to draw a fluid flow through an upstream heat exchanger.

Referring now to FIG. 1, there is depicted therein, in part schematically, an air cycle system of the type used conventionally on aircraft for conditioning air to be supplied to the passenger and/or pilot cabins. A stream of pressurized air 1, typically bleed air from the aircraft engine system, to be conditioned, that is cooled to a desired temperature, dehumidified, and pressure regulated, is precooled before being passed through the compressor 12 of an air cycle machine 10, by passing the incoming bleed air 1 through the tubes of a heat exchanger bundle 26 in indirect heat exchange relationship with a cooling fluid, typically ram air 21, drawn through a gas-to-gas type heat exchanger 20 over the tubes of the heat exchanger bundles 26 therein by means of the fan 14 of the air cycle machine 10. The fan 14, as well as the compressor 12, are commonly mounted, together with a turbine 16, to the shaft 18 which extends along the central axis of the air cycle machine 10. Advantageously, the fan 14 and the compressor 12 are powered by the turbine 16 which rotatably drives the shaft 18 in response to the expansion of the compressed air being conditioned as it passes therethrough.

The precooled bleed air 3 passes from the heat exchanger 20 through the compressor 12 of the air cycle machine 10 wherein it is compressed to a desired higher pressure. The compressed bleed air 5 discharged from the compressor 12 is further cooled by again being passed through the heat exchanger 20 in heat exchange relationship with the cooling air 21. The further cooled compressed bleed air 7 is thence passed through a condensing heat exchanger 60 in heat exchange relationship with a further cooling fluid to reduce the temperature of the compressed bleed air 7 below the dew point of the compressed bleed air 7 so as to cause the moisture therein to condense. After the water condensed from the compressed bleed air 7 is removed therefrom in water trap 70, the dehumidified compressed bleed air 9 is passed through the expansion turbine 16 to provide the fluid energy to the turbine 16 of the air cycle machine 10 necessary to rotatably drive the shaft 18 and in turn the compressor 12 and fan 14 commonly mounted to the shaft 18. As the compressed air passes through the turbine 16 it is not only expanded to a desired pressure for supply to the passenger and/or pilot cabins of the aircraft for pressurizing those areas to a comfortable level, but also subcooled to a temperature below the desired temperature at which it is to be admitted to the aircraft cabin. The subcooled conditioned air 11 is thereafter passed through the condensing heat exchanger 60 as the cooling fluid in indirect heat exchange relationship with the compressed bleed air 7 whereby the compressed bleed air 7 is cooled below its dew point and the conditioned expanded air 11 is heated to the desired temperature at which the fully conditioned air 13 is to be supplied to the cabins.

As noted hereinbefore, the flow of cooling air 21 through the heat exchanger 20 is induced by the fan 14 of the air cycle machine 10. The outlet plenum 28 of the heat exchanger 20 is connected in flow communication with the fan 14 of the air cycle machine 10 by means of the fan inlet and diffuser apparatus 30 of the present invention. At ground level, ambient cooling air 21 is drawn from outside the aircraft through inlet duct 22 into the inlet plenum 24 of the heat exchanger 20 substantially solely by inducement by the fan 14 of the air cycle 10. At cruise, however, the ram effect of the incoming cooling air provides a substantial fraction of the force necessary to draw the cooling air through the heat exchanger 20, thus substantially reducing the power requirements on the fan 14 of the air cycle machine 10. In any case, the cooling air 21 is drawn from the inlet plenum 24 through at least one, and typically two, banks 26 of heat exchange tubes through which the bleed air passes, into the outlet plenum 28 of the heat exchanger 20, and thence through an outlet opening thereof directly into the fan inlet and diffuser housing 30 through the inlet 32 thereof which advantageously mates directly to the outlet opening of the outlet plenum 28 of the heat exchanger 20.

As best seen in FIGS. 2 and 3, the fan inlet and diffuser apparatus 30 of the present invention comprises an axially extending outer housing 40 having a proximate end adapted for mounting about the discharge side of the fan 14 and an axially spaced distal end, an axially extending inner housing 50 disposed coaxially within this outer housing 40 and having a distal end connected to the distal end of the outer housing 40 and a proximate end spaced inwardly from the proximate end of the outer housing 40 thereby defining an outlet flow 52 passageway, commonly a diverging outlet flow passageway, for receiving fluid flow discharging from the fan 14 interiorly of the inner housing 50 and an inlet flow passageway 42 thereabout between the inner housing 40 and the outer housing 50, and mixing means 60 operatively associated therewith.

As best seen in FIG. 4, in addition to the inlet 32 in its wall for receiving the cooling air 21 from the heat exchanger 20 into the inlet flow passageway 42 thereof, the outer housing has a first outlet 44 at the proximate end thereof for directing a first portion 23 of the cooling air flow 21 passing through the inlet flow passageway 42 to the inlet side of the fan 14 and a second outlet 46 at the proximate end thereof for directing a second portion 25 of the cooling air flow 21 passing through the inlet flow passageway 42 directly into the outlet flow passageway 52 disposed interiorly of the inner housing 50 to be recombined therein with the cooling air flow 27 flow discharging from the fan 14. The inner housing 50 has a central inlet 54 at the proximate end thereof for receiving cooling air flow 27 discharging from the discharge side of the fan 14 and a central outlet 56 at the distal end thereof for discharging the recombined flow 29 therefrom.

The cooling air flow 21 entering through the inlet 32 is circumferentially distributed as it flows through the inlet flow passageway 42 towards the proximate end of the fan inlet and diffuser apparatus 30, i.e. the end thereof mounted to fan housing of the air cycle machine 10. As the cooling air flow 21 approaches the proximate end of the inlet flow passageway 42, it divides into two portions, i.e. the fan inlet flow 23 and the bypass flow 25. The design of the fan inlet and diffuser apparatus and its mixing means 60 inherently induces by momentum transfer the bypass flow 25. The fan inlet flow 23 passes from the inlet flow passageway 42 through the first outlet passageway 44, which advantageously is an annular outlet opening disposed about the mixing means 60, into and through a hemi-toroidal duct 48 which turns the incoming fan inlet flow through 180 degrees for delivery directly into the fan 14. The second annular outlet 46 advantageously comprises a circumferential band-like outlet at the proximate end of the inner housing 50. That portion of the cooling air flow 21 which forms the bypass flow 25 is drawn through the second outlet 46 by the static pressure differential developed between the incoming flow 21 passing through the first inlet flow passageway 42 and the fan discharge flow 27 passing out of the central flow conduit 62 of the mixing means 60. As the bypass flow 25 passes from the first inlet passageway 42 into the outlet flow passageway 52, it turns 180 degrees, traversing the second outlet 46 and passing over the lobes 66 of the mixing ejector 64 as it enters the outlet flow passageway 52 defined within the inner housing 50.

Figure 5:
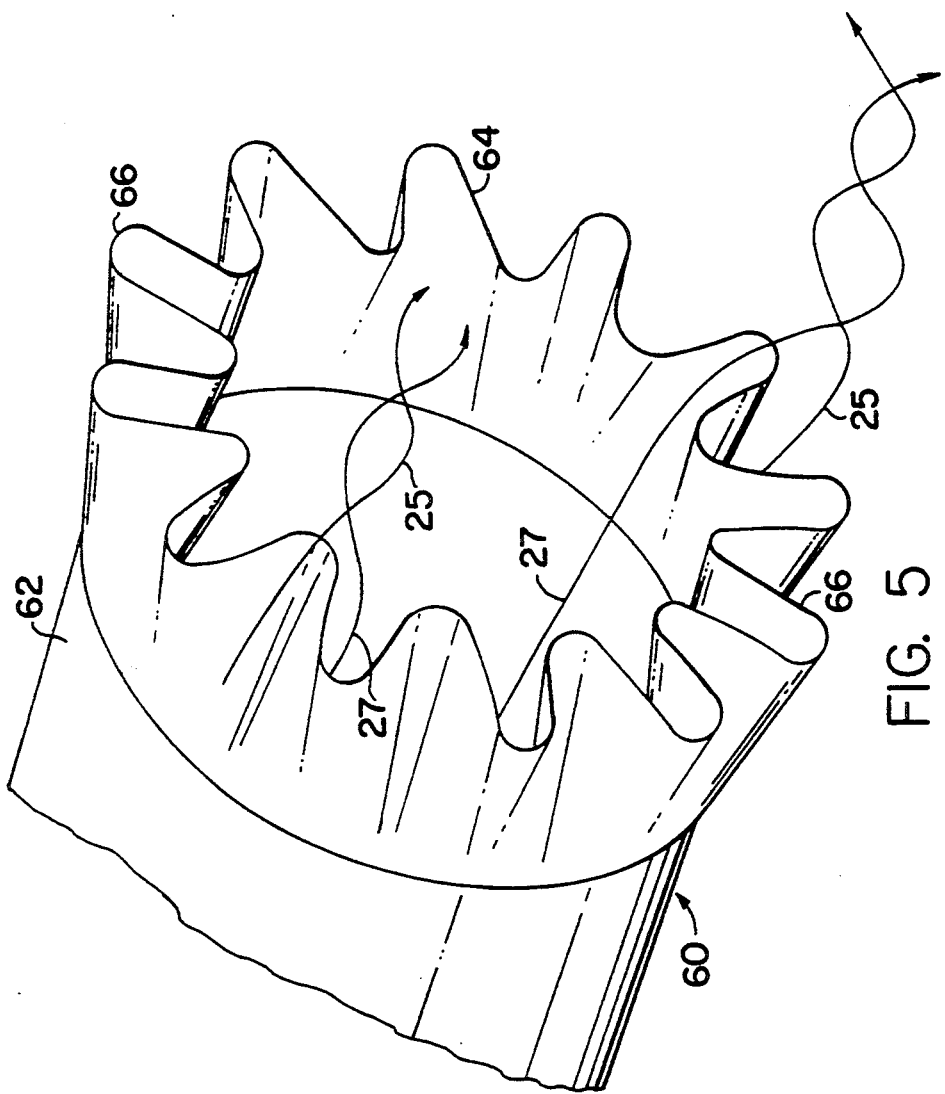
FIG. 5 is a perspective view of a preferred embodiment of the lobe mixer housed in the fan inlet and diffuser apparatus.

The mixing means 60 is operatively disposed relative to the second outlet 46 of the inlet flow passageway 42 and the discharge side of the fan 14 for imparting swirl to the bypass flow 25 and the discharge flow 27 from the fan 14 whereby these flows are intermixed in the outlet flow passageway 52 disposed interiorly of the inner housing 50. Advantageously, the mixing means 60 comprises an annular conduit 62 having a lobed mixing ejector 64 at its distal end such as illustrated in FIG. 5. The lobes 66 impart a counter swirl to the flow streams. That is, the bypass flow 25 of the cooling air which passes from the second outlet 46 of the inlet flow passageway 42 into the outlet flow passageway 52 over the outside of the lobed mixing ejector 60 is caused to swirl in one direction as it passes over the lobes 66, while the discharge flow 27 passing from the discharge side of the fan 14 through the flow passageway of the conduit 62 of the mixing means 60 into the outlet flow passageway 52 is caused to swirl in the opposite direction as it passes past the lobes 66. As a result of the counter swirling of the bypass flow 25 and the discharge flow 27, these flows are effectively intermixed in a substantially shorter distance than experienced in diffusers not equipped with such mixing means. Additionally, the inter swirling of these flows results in flow interactions which reduce the fan noise associated with such air cycle machines thus resulting in quieter operation.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. An air cycle machine for conditioning a pressurized gaseous fluid comprising:
   a. an axially extending housing means;
   b. shaft means extending coaxially within said machine housing means;
   c. at least first turbine means mounted to said shaft means, said shaft means being rotatably driven upon rotation of said turbine means, said turbine means being rotatably driven in response to the passage therethrough of the pressurized gaseous fluid being condensed from a source thereof;
   d. fan means for inducing a flow of gaseous cooling fluid to pass in heat exchange relationship with the pressurized gaseous fluid being conditioned, said fan means mounted to a first end portion of said shaft means for rotation therewith, said fan means having an upstream inlet side and a downstream discharge side;
   e. flow inlet and diffuser means mounted to said machine housing means for ducting a first portion of a flow of the gaseous cooling fluid to the inlet side of said fan means to pass therethrough and a second portion of the flow of the gaseous cooling fluid to the discharge side of said fan means and for ducting the first and second flow portions from the discharge side of said fan means out of said air cycle machine; and f. mixing means operatively disposed within said flow inlet and diffuser means relative to the downstream side of said fan means for imparting swirl to both the first and second portions of the gaseous cooling fluid whereby the first and second portions are intermixed for discharge.

2. An air cycle machine as recited in claim 1 wherein said inlet and diffuser means comprises:
   a. an axially extending outer housing having a proximate end adapted for mounting to the fan end of the air cycle machine and an axially spaced distal end; and
   b. an axially extending inner housing disposed coaxially within said outer housing and having a distal end connected to the distal end of said outer housing and a proximate end spaced inwardly from the proximate end of said outer housing thereby defining:
   an outlet flow passageway for receiving fluid flow discharging from said fan interiorly of said inner housing and having a central inlet at the proximate end thereof for receiving fluid flow discharging from said fan and a central outlet at the distal end thereof, and
   an inlet flow passageway thereabout between said inner housing and said outer housing having a first outlet at the proximate end thereof for directing a first portion of the fluid flow passing therethrough to the inlet of said fan and a second outlet at the proximate end thereof for directing a second portion of the fluid flow passing therethrough directly into the outlet flow passageway disposed interiorly of said inner housing.

3. An air cycle machine as recited in claim 2 wherein said mixing means is operatively disposed relative to the second outlet of said inlet flow passageway and the discharge side of said fan means for imparting swirl to both the first portion of the gaseous cooling fluid flow discharging from said fan means and the second portion of the fluid flow bypassing said fan means whereby the first and second portions are intermixed in the outlet flow passageway disposed interiorly of said inner housing.

4. An air cycle machine as recited in claim 3 wherein said mixing means imparts a swirl to the second portion of the gaseous cooling fluid flow which is counter relative to the swirl said mixing means imparts to the first portion of the gaseous cooling fluid flow.

5. An air cycle machine as recited in claim 4 wherein said mixing means comprises a lobe mixer.

* * * * *

UNITED STATES PATENT AND TRADEMARK OFFICE
CERTIFICATE OF CORRECTION

PATENT NO. : 5,133,194
DATED : July 28, 1992
INVENTOR(S) : Donald E. Army, Christopher McAuliffe and William C. Crabtree It is certified that error appears in the above-identified patent and that said Letters Patent is hereby corrected as shown below:

Column 8, line 14, of claim 3, before "fluid" insert --gaseous cooling--.

Signed and Sealed this

Fourteenth Day of September, 1993

Attest:

BRUCE LEHMAN

Attesting Officer        Commissioner of Patents and Trademarks